United States Patent [19]

Days

[11] 4,424,080
[45] Jan. 3, 1984

[54] PROCESS FOR HYDROLYSIS REMOVAL OF CONDENSATION POLYMER FROM VARIOUS OBJECTS

[75] Inventor: Frank Days, Peabody, Mass.

[73] Assignee: Beringer Co., Inc., Marblehead, Mass.

[21] Appl. No.: 367,904

[22] Filed: Apr. 13, 1982

[51] Int. Cl.³ .............................................. B08B 3/00
[52] U.S. Cl. ........................................ 134/5; 134/31; 134/37; 134/38
[58] Field of Search .................... 134/5, 22.12, 21, 31, 134/37, 38

[56] References Cited

U.S. PATENT DOCUMENTS

| | | |
|---|---|---|
| 2,907,687 | 10/1959 | Scigliano . |
| 2,917,418 | 12/1959 | Cathcart .............................. 134/5 |
| 3,119,720 | 1/1964 | Stiles . |
| 3,188,239 | 6/1965 | Kloppers . |
| 3,250,643 | 5/1966 | Sergent . |
| 3,426,091 | 2/1969 | Miron ................................. 134/5 X |
| 3,485,670 | 12/1969 | Fisher . |
| 3,510,350 | 5/1970 | Priebe .............................. 134/22.12 |
| 3,523,827 | 8/1970 | Sims . |
| 4,220,480 | 9/1980 | Dwan ..................................... 134/5 |

OTHER PUBLICATIONS

Chemical Abstracts, 70: 12582z (1969).

Primary Examiner—Sidney Marantz
Attorney, Agent, or Firm—Kenway & Jenney

[57] ABSTRACT

Condensation polymer coatings are removed from various objects to permit their reuse. Superheated water vapor flows in contact with the coating surfaces, excluding air therefrom while heating them to temperatures above the melting point of the polymer. The water vapor further enters into an hydrolysis reaction with the polymer to decompose it.

6 Claims, 1 Drawing Figure

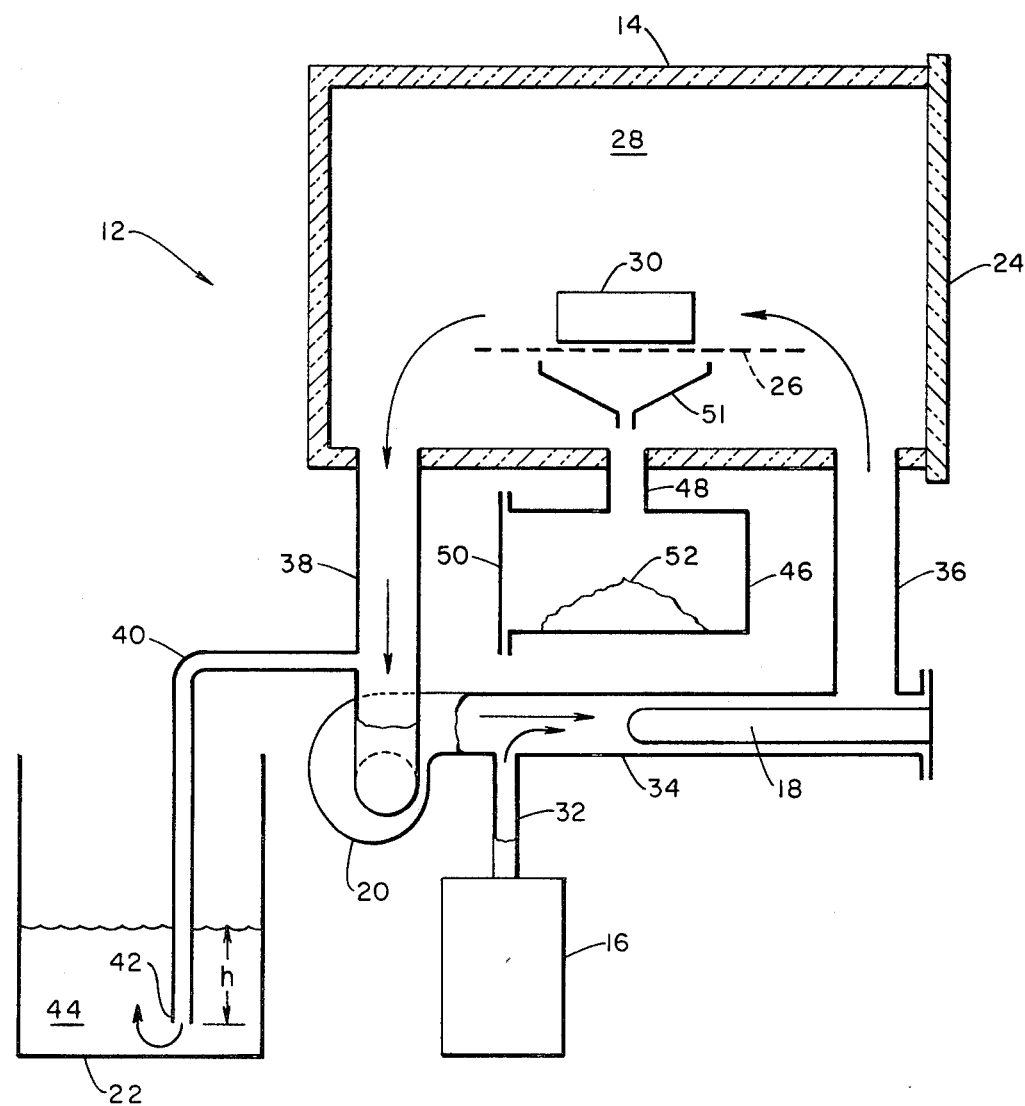

PROCESS FOR HYDROLYSIS REMOVAL OF CONDENSATION POLYMER FROM VARIOUS OBJECTS

BRIEF SUMMARY OF THE INVENTION

This invention relates generally to the removal of polymers from various reuseable objects, for example molded inserts and polymer processing equipment such as spin packs, filters, melt pumps, and the like. More particularly, the invention relates to a technique for the removal of condensation polymers by hydrolysis. In general, it is desirable that such technique be economical, safe, environmentally acceptable and not damaging to the structural or metallurgical properties of the hardware being cleaned.

None of the techniques in common use meet all of the above goals. The deficiencies in each depend on the type of polymer and the particular technique used. Two of the techniques in common use by the polymer processing industries for removing polymers from process hardware are (1) the use of solvents such as glycols, methylene chloride or other common solvent reagents, and (2) thermal techniques such as the use of a fluidized, heated granular bed, a molten salt bath or a vacuum or inert atmosphere furnace.

Solvent techniques are generally employed at temperatures low enough to avoid any disturbance of the metallurgical properties of the hardware. However, the most efficient cleaning action occurs at temperatures greater than the normal boiling points of the solvents, thus necessitating the use of pressure vessels. The use of such vessels is undesirable because of the inherent cost involved and the requirement for seals and safety locks. Non-pressurized solvent cleaning systems typically evolve fumes and may require extended cleaning cycles. The cost of chemicals may be prohibitively high. Further, the problem of disposing of, treating or reclaiming the by-products from the solvent vessel in a cost effective and environmentally safe manner may present a considerable difficulty. In some cases, the use of solvents may give rise to a possibility of explosion.

In thermal techniques the cleaning is accomplished by heating to a temperature sufficient to cause degradation of the polymer. The part to be cleaned is usually heated to about 400° to 510° C. These techniques usually include the limited introduction of air to complete the degradation. The introduction of air is limited by immersing the part in a partial vacuum or partial inert atmosphere such as steam or inert gases. At the temperatures used, the degradation of the polymer is accompanied by the evolution of certain volatile components in the compound. Any emissions resulting from such cleaning must usually be treated to reduce particulates and potentially toxic volatile hydrocarbons. Also, there is a possibility of thermally damaging the part to be cleaned.

The prior art further includes in situ methods for removing condensation polymers including their degradation by hydrolysis, as described for example in U.S. Pat. No. 3,510,350 to Priebe. This patent describes a technique for cleaning nylon transfer systems by subjecting pipelines heated by external sources to saturated steam. This technique requires the use of elevated pressures, for example 17.58 Kg. per cm$^2$ (250 psi), with the attendant problems previously mentioned.

With a view to overcoming the several objectionable features of the techniques described above, the present invention is characterized by its use of hydrolysis reactions to remove from objects coatings of condensation polymers of those types that are decomposable by hydrolysis. The reactions are characterized in a physical aspect by a reduction in the melt viscosity of the polymer, allowing a portion to drip from the object, and in a chemical aspect by the water vapor entering into a reversal of the polymerization reaction, with monomers and other species being evolved and entrained in the moving stream of the vapor.

To this end, the invention employs an enclosed vessel through which superheated water vapor is circulated, the vapor serving to heat the objects and being maintained at a temperature above the melting point of the polymer but below that which causes damage to the objects being cleaned. The pressure within the vessel is sufficient to exclude ambient air from contact with the objects to be cleaned, and in many applications it is only slightly above atmospheric.

BRIEF DESCRIPTION OF THE DRAWING

The drawing is a partly schematic illustration of the presently preferred embodiment of a system performing the process of this invention.

DETAILED DESCRIPTION

Referring to the drawing, equipment for carrying out the process according to this invention, designated generally at 12, includes a process chamber 14, a steam boiler 16, a superheater 18, a circulation blower 20 and a holding tank 22. The arrows indicate the directions of flow of steam and superheated water vapor within the system as described below.

The process chamber is preferably an insulated horizontal cylindrical steel vessel having a closed end and an access door 24. A suitable carriage mechanism (not shown) is mounted externally and in front of the door in position for fixturing and loading onto a suitable support 26 the objects or parts to be cleaned of polymer. These parts are represented for purposes of illustration by a part 30, and are preferably situated in a position that will facilitate the flow of steam and water vapor around and in contact with the surfaces coated with polymer.

The steam boiler 16 is of conventional construction and is adapted to deliver steam at a selected weight rate per unit of time through a pipe 32 into an elongate superheating chamber 34. A pipe 36 is located so that steam from the boiler 16 passes over the superheater 18 and through the pipe 36 into the confined space 28. A pipe 38 is located at the end of the space 28 in position to deliver steam and water vapor back to the blower 20.

A vent line pipe 40 is let into the pipe 38 and has an open end 42 within the holding tank 22. The end 42 is immersed to a height "h" in a body of water 44, the value of "h" being preferably of the order of 30 cm.

A primary trap 46 is located below the process chamber or vessel 14 and connected thereto by a pipe 48. The trap is a metal enclosure with an access door 50, and is located so that molten polymer dripping from the part 30 will fall and flow by gravity through the support 26, which is preferably an open mesh wire screen or the like, onto a drip pan 51 with sloping sides, and thence through the pipe 48 into a body 52 where it is congealed for ready removal.

The presently preferred process using the apparatus of the drawing is initiated upon the placing of the part or parts 30 to be cleaned into the space 28, with the access door 24 being then sealed. The steam boiler 16 is then fired and the blower 20 is started. When steam begins to be generated, it passes through the pipe 32, enters the chamber 34 and then follows a recirculation path from the chamber 34 to the pipe 36, through the space 28, the pipe 38 and the blower 20, back to the chamber 34. At the same time, a fraction of the steam passing through the pipe 38 enters the vent line 40 and passes out of the end 42 into the body of water 44. The fraction of the steam passing through the pipe 38 that enters the vent line 40 is a function of the steam flow rate generated by the boiler 16.

Following the initial start-up of the blower 20, air within the system including the space 28 is entrained in the circulating steam including the steam which passes out through the vent line 40. In this manner, the steam progressively displaces the air from the space 28.

The superheater 18 is fired when the steam entering the system has caused the pressure to rise to a predetermined level, thereby causing the progressive elevation of the temperature of the circulating steam, and the steam ultimately passes from the saturated state to the superheated state. Since the system is at nearly atmospheric pressure, this occurs at a temperature of approximately 100° C. Thereafter, superheated water vapor continues to flow in a stream through the space 28 around and over the part 30. The temperature of the water vapor continues to rise and ultimately reaches a predetermined value in the range between 270° and 400° C. For typical condensation polymers, the melting temperature is reached at approximately the lower end of this range, and within this range hydrolysis action takes place at a rapid rate.

As the polymer reaches the melting temperature, it flows from the part 30, falling under the force of gravity to the drip pan 51 and thence through the pipe 48 to the trap 46. Since the trap 46 is relatively isolated from the space 28 and not in direct contact with the moving stream of superheated water vapor, it is at a lower temperature than the space 28, typically low enough to allow the polymer to solidify at 52, thereby being removed from the cleaning process.

Since the source of heat for the part 30 in this process comprises only the moving stream of superheated water vapor, the surfaces of the polymer coating the part are at the highest temperatures in the part 30, and are rapidly hydrolyzed by reaction with the moving stream of vapor. The relative motion between the vapor stream and the surfaces of the polymer coating assures a constantly replenished supply of water vapor for supporting the hydrolysis reaction with those surfaces. Moreover, as molten polymer flows and drips from the surfaces, the surfaces themselves are constantly renewed and replaced by fresh surfaces of unreacted polymer for exposure to the moving vapor.

Products of hydrolysis are entrained in the moving stream of vapor which then enters the pipe 38. One portion of this stream is recirculated through the blower 20, the chamber 34 and the pipe 36 back through the space 28 and another fraction is drawn off through the vent line 40. Vapor with entrained products passes through the opening 42 into the water 44 which traps many of the products.

After the process has continued for a sufficient length of time, the superheater 18 is shut off and a cooldown cycle begins. Preferably, during this cycle the boiler 16 and blower 20 continue to operate until the superheated water vapor has been reduced in temperature to a value below the melting point of the polymer at which the part 30 may be safely removed. Finally, the boiler and blower are shut down and the door 24 may be opened to retrieve the cleaned part 30.

In the above-described process the superheated water vapor performs three distinct functions. First, it is a heat transfer medium by means of which heat is applied to the part 30 to elevate the polymer coating thereon to the desired temperature, there being a continuous relative motion between the moving stream and the surfaces of the part 30. Second, the superheated water vapor acts as a purge and blanket medium, shielding the part 30 with its heated coating from contact with air and minimizing oxidation. Third, the water vapor comprises the hydrolysis process reagent as above described.

Certain variations in the above-described process may be carried out, as described above and as will be further evident to one skilled in the art. For example, thermostatic sensors can be installed to monitor temperatures at various points in the system. Timers may also be employed for starting and stopping the operation, of the boiler 16, the superheater 18 and the blower 20 as functions not only of time but also of the temperature within the space 28. The height "h" of the head of water may be varied, but in any event is not sufficient to elevate the pressure within the system substantially above atmospheric. The pressure is typically less than 15 psig. Also, alternate means may be employed to restrict the outlet flow in order to maintain the desired pressure in the system. In the above-described illustration the value of "h" is approximately 30 cm, elevating the pressure within the space 28 to only about 30 gm. per cm.$^2$ (0.43 psi.) above atmospheric. Also, variations in temperatures of processing can be employed to accommodate the particular types of condensation polymers to be removed.

I claim:

1. A process for removing from an object a coating of condensation polymer of the type that is decomposable by hydrolysis, including the steps of
   placing the object within a vessel forming a confined space,
   purging said space of air by producing a flow of steam into and through the vessel,
   and producing an hydrolysis reaction in the polymer by causing superheated water vapor to flow into and through the vessel and in flowing contact with the surface of said coating, said vapor being at a temperature sufficient to melt said coating at said surfaces and to produce a gravity-induced drippage of molten polymer from the object, thereby causing fresh surfaces of the coating to be subjected to the hydrolysis reaction.
2. The process according to claim 1, in which the pressure of the superheated water vapor is less than 15 psig.
3. The process according to claim 1, in which the polymer coating is maintained at a temperature substantially below its melting point until said space has been substantially completely purged of air.
4. The process according to claim 1, including venting of the vapor from said vessel under a head of collecting liquid.
5. The process of claim 1, followed by the step of progressively reducing the temperature of said vapor to a value below the melting point of the polymer while maintaining a sufficient flow thereof to prevent air from entering said space.
6. The process according to claim 1, in which the vapor leaving the vessel is divided between a discharge path and a recirculation path returning to the vessel.

* * * * *